United States Patent
Jia et al.

(10) Patent No.: US 9,100,509 B1
(45) Date of Patent: Aug. 4, 2015

(54) DYNAMIC BIT ALLOCATION IN PARALLEL VIDEO ENCODING

(75) Inventors: Wei Jia, San Jose, CA (US); Qunshan Gu, Hayward, CA (US)

(73) Assignee: GOOGLE INC., Mountain View, CA (US)

( * ) Notice: Subject to any disclaimer, the term of this patent is extended or adjusted under 35 U.S.C. 154(b) by 553 days.

(21) Appl. No.: 13/368,324

(22) Filed: Feb. 7, 2012

(51) Int. Cl.
H04N 7/12 (2006.01)
H04N 7/00 (2011.01)

(52) U.S. Cl.
CPC .................................. H04N 7/00 (2013.01)

(58) Field of Classification Search
CPC .......... H04N 7/26287; H04N 7/26292; H04N 19/00266
USPC .................................................... 375/240.16
See application file for complete search history.

(56) References Cited

U.S. PATENT DOCUMENTS

| | | | | |
|---|---|---|---|---|
| 5,794,179 | A * | 8/1998 | Yamabe | 704/205 |
| 6,160,846 | A * | 12/2000 | Chiang et al. | 375/240.05 |
| 6,181,742 | B1 * | 1/2001 | Rajagopalan et al. | 375/240 |
| 6,366,704 | B1 | 4/2002 | Ribas-Corbera et al. | |
| 6,876,703 | B2 | 4/2005 | Ismaeil et al. | |
| 7,764,739 | B2 | 7/2010 | Yamada et al. | |
| 7,813,570 | B2 | 10/2010 | Shen et al. | |
| 2002/0012396 | A1 * | 1/2002 | Pau et al. | 375/240.16 |
| 2006/0256858 | A1 * | 11/2006 | Chin | 375/240.03 |
| 2006/0291567 | A1 * | 12/2006 | Filippini et al. | 375/240.24 |
| 2008/0198920 | A1 * | 8/2008 | Yang et al. | 375/240.01 |
| 2009/0238277 | A1 | 9/2009 | Meehan | |
| 2010/0183076 | A1 | 7/2010 | Yoon | |
| 2010/0239181 | A1 * | 9/2010 | Lee et al. | 382/264 |
| 2012/0147958 | A1 * | 6/2012 | Ronca et al. | 375/240.16 |
| 2013/0083161 | A1 * | 4/2013 | Hsu et al. | 348/43 |

* cited by examiner

*Primary Examiner* — Tracy Li
(74) *Attorney, Agent, or Firm* — Young Basile Hanlon & MacFarlane P.C.

(57) ABSTRACT

Techniques for efficient coding of digital media data are presented. A resource controller component dynamically allocates computing resources between an estimator component and a coder component. The estimator component generates initial motion estimation of a raw video frame of a sequence, based on a previous raw video frame, in parallel with the coder component encoding the previous raw video frame to generate a reconstructed previous video frame. The coder component encodes the raw video frame based on the reconstructed previous video frame. The coder component can dynamically allocate initial subsets of bits for respective coding units of the raw video frame based on residual data identified from the initial motion estimation. After completing encoding of a specified number of coding units, the coder component can dynamically adjust bit assignments for remaining coding units of the raw video frame based on initial residual data and identified real residual data.

20 Claims, 10 Drawing Sheets

DYNAMIC BIT ALLOCATION IN PARALLEL VIDEO ENCODING

TECHNICAL FIELD

This disclosure relates generally to video processing, and more specifically to dynamic bit allocation in parallel video encoding.

BACKGROUND

The amount of data representing media information, such as a still image and video image, can be extremely large. Further, transmitting digital video information over communication networks can consume large amounts of bandwidth. The cost of transmitting data from one location to another can be a function of number of bits transmitted per second. Typically, higher bit transfer rates are associated with increased cost. Higher bit rates also can progressively add to required storage capacities of memory systems, which can thereby increase storage cost. Thus, at a given quality level, it can be much more cost effective to use fewer bits, as opposed to more bits, to store digital images and videos. It therefore can be desirable to compress media data for recording, transmitting, or storing.

For a typical compression scheme, achieving higher media quality can require that more bits be used, which can, in turn, increase cost of transmission and storage. While lower bandwidth traffic may be desired, so may higher quality media.

An encoder is a device capable of encoding (e.g., coding) (and sometimes decoding) digital media data. A decoder is a device capable of decoding digital media data. A codec is a device capable of coding and/or decoding digital media data. The term codec is derived from a combination of the terms code and decode, or the terms compress and decompress. A variety of codecs are commercially available. Generally speaking, for example, codec classifications can include discrete cosine transfer codecs, fractal codecs, and wavelet codecs. An encoder or codec, by encoding the digital media data, can reduce the number of bits required to transmit signals, which can thereby reduce associated transmission costs.

During encoding of video frames of a video, bit allocation can be an integral task to achieve desired video quality while also controlling costs associated with bit usage. Assignment of a proper (e.g., correct, optimal) number of bits to each coding unit (e.g., blocks, macroblocks) can improve visual quality of the video significantly. Conventional encoding systems, using sequential encoding processes, may not assign a proper number of bits to each coding unit. As a result, video quality may be undesirably (e.g., negatively) affected and/or the costs of transmission and storage of the video may be undesirably increased.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to encoding video. Disclosed herein is a system including an estimator component that generates an initial motion estimation of a raw video frame of a sequence of raw video frames of a video based at least in part on a previous raw video frame of the sequence. The system also includes a coder component that dynamically allocates respective initial subsets of bits to respective coding units of the raw video frame based at least in part on at least statistics relating to residual data associated with the initial motion estimation of the raw video frame and at least one predefined encoding criterion.

Also disclosed herein is a method including employing at least one processor to facilitate execution of code instructions retained in at least one memory device. The code instructions, in response to execution, perform acts comprising: generating an initial motion estimation of a raw video frame of a sequence of raw video frames of a video based at least in part on a previous raw video frame of the sequence; and dynamically assigning respective initial subsets of bits to respective coding units of the raw video frame based at least in part on at least statistics relating to residual data associated with the initial motion estimation of the raw video frame and at least one predefined encoding criterion.

Further disclosed herein is a system including means for producing an initial motion estimation of a raw video frame of a sequence of raw video frames of a video based at least in part on a previous raw video frame of the sequence. The system also includes means for allocating respective initial subsets of bits to respective coding units of the raw video frame based at least in part on at least statistics relating to residual data associated with the initial motion estimation of the raw video frame and at least one predefined encoding criterion.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
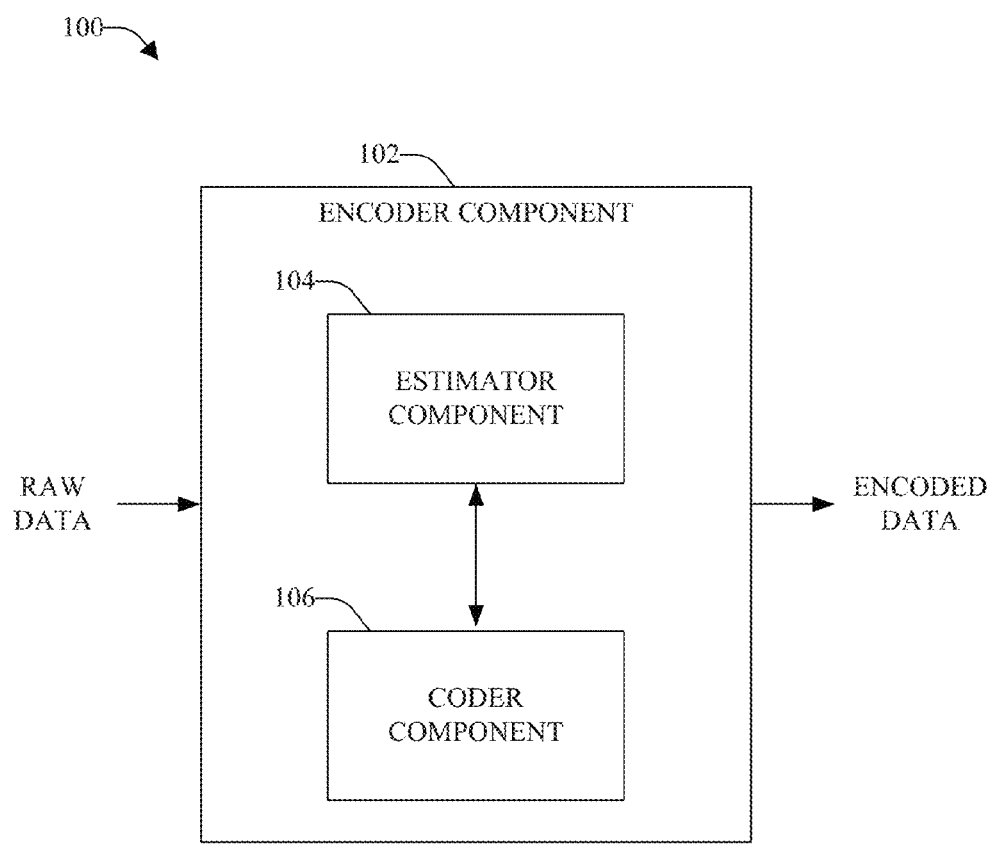
FIG. 1 illustrates a block diagram of an example system that can efficiently allocate bits for a raw video frame to facilitate efficiently encoding the raw digital frame in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The amount of data representing media information can be extremely large. Further, transmitting digital video information over communication networks can consume large amounts of bandwidth. The cost of transmitting data from one location to another can be a function of number of bits transmitted per second. Typically, higher bit transfer rates are associated with increased cost. Higher bit rates also can progressively add to required storage capacities of memory systems, which can thereby increase storage cost. Thus, at a given quality level, it can be much more cost effective to use fewer bits, as opposed to more bits, to store digital images and videos. It therefore can be desirable to compress media data for recording, transmitting, or storing.

An encoder is a device capable of encoding (e.g., coding) (and sometimes decoding) digital media data. During encoding of video frames of a video, bit allocation can be an integral task to achieve desired video quality while also controlling costs associated with bit usage. Assignment of a proper (e.g., correct, optimal) number of bits to each coding unit (e.g., blocks, macroblocks) can improve visual quality of the video significantly. Conventional encoding systems, using sequential encoding processes, may not assign a proper number of bits to each coding unit. As a result, video quality may be undesirably (e.g., negatively) affected and/or the costs of transmission and storage of the video may be undesirably increased.

To allocate the proper number of bits to coding units of a video frame, it can be desirable for the encoder to know the statistics (e.g., residual data statistics) of the video frame or slice. An encoder using sequential processing may not have such statistics available, unless a multiple-pass approach is employed. Parallel processing available in devices with a multiple core/processor architecture can be leveraged to enable an encoder component to have information regarding the statistics and characteristics of the video frame or slice before real coding of the frame or slice.

To that end, novel techniques for coding of digital media data are presented. An encoder component can dynamically allocate bits to be used for encoding a raw video frame of a video frame sequence based at least in part on coding-related statistics associated with the raw video frame or slice, and available bits. The encoder component can use parallel processing to facilitate obtaining the coding-related statistics, including statistics relating to the residual data, associated with the raw video frame or slice. During a coding pass relating to coding of the raw video frame, the encoder component can dynamically adjust bit allocation based at least in part on bit counts previously consumed (e.g., actually consumed) during the coding pass and remaining coding units associated with that video frame.

The encoder component can leverage multiple core/processor architecture to facilitate efficient allocation of bits during encoding of a raw video frame or slice. In some implementations, the encoder component can perform motion estimation using a multi-stage process. The encoder component can include an estimator component that can perform an initial motion estimation using raw data of a current raw video frame (or slice) and the previous raw video frame (e.g., reference frame) in parallel to other tasks associated with coding of the previous raw video frame. After the initial motion estimation is performed on the raw video frame, coding-related statistics, including statistics relating to residual data (e.g., initial or estimated residual data), associated with coding units can be available for use by the encoder component. The statistics relating to residual data typically can be represented by energy of the residual data of the coding units (e.g., the sum of absolute value of the residual data in coding units). Those statistical residual data energy values can be available to the encoder component during motion searching, which can facilitate bit allocation for coding units of the raw video frame or slice.

The encoder component also can include a coder component that can identify an initial bit allocation based at least in part on various factors and targeted total bit count available for the raw video frame or slice. One factor can be the residual data energy from initial motion estimation. The coder component can determine (e.g., calculate) an assigned bit count of each coding unit (e.g., block, macroblock) of the raw video frame as a function of those factors (e.g., using a bit assignment function and/or algorithm). This function (e.g., bit assignment function) can be obtained from offline experiments or other previous knowledge (e.g., previous information relating to encoding data) and/or can be identified dynamically based at least in part on accumulated information relating to encoding data.

The coder component can perform a coding pass to encode one or more coding units of the raw video frame based at least in part on the reconstructed reference video frame (e.g., the reconstructed previous video frame). The coder component can encode the raw video frame based at least in part on the initial motion estimation or a refined motion estimation (e.g., a refinement of the initial motion estimation for all or a portion of the coding units) associated with the raw video frame.

During the coding pass to encode the raw video frame, after completing encoding of a subset of the coding units of the raw video frame, the coder component can dynamically adjust respective bit assignments for coding units that remain to be encoded based at least in part on real residual data associated with the subset of encoded coding units associated with the video frame, remaining bits available for allocation (e.g., re-allocation), and/or information relating to the residual data energy of the initial motion estimation. The coder component can calculate the real residual data for encoding the subset of encoded coding units based at least in part on the reconstructed reference video frame. In certain instances, the real consumed bit count associated with the subset of encoded coding units can be different from the estimated bit count associated with the initial allocation of bits. The coder component can identify or calculate (e.g., using a bit assignment function) the number of remaining bits available for use to encode the remaining coding units of the video frame as a function of the real consumed bit count associated with the subset of encoded coding units (e.g., the remaining bits can be equal to the original number of bits minus the number of real consumed bits). The coder component can re-distribute (e.g., dynamically or automatically re-allocate) remaining bits to remaining coding units left to be encoded, based at least in part on the estimated residual data energy associated with the initial motion estimation (e.g., the initial motion estimation relating to the remaining coding units).

In some implementations, the encoder component or an encoding system can include a resource controller component that can dynamically allocate computing resources (e.g., processors) between the estimator component and the coder component based at least in part on the total available computing resources, media content complexity, statistical information relating to previously encoded data, one or more pre-defined encoding criterion, and/or other factors. The video processing system can include a plurality of processors (e.g., processing units), and the resource controller component can assign a subset of the processors to the estimator component and another subset of the processors to the coder component to facilitate parallel processing of the digital media data (e.g., video frames) to efficiently encode such data.

The estimator component can generate an initial motion estimation of a current raw video frame of a sequence of raw video frames of a video based at least in part on a previous raw video frame, which can be used as a reference video frame, at least initially, during encoding of the raw video frame. The coder component can encode the previous raw video frame, which can include generating a reconstructed previous video frame, in parallel with the generation or performance of the initial motion estimation by the estimator component.

Using the initial motion estimation, the coder component can begin to encode the current raw video frame. The coder component can analyze the residual data energy from the initial motion estimation for the current raw video frame. The coder component can assign respective initial subsets of bits to coding units of the current raw video frame based at least in part on the results of the analysis. For example, the coder component can assign more bits to coding units associated with higher residual data energy and a lower number of bits to coding units associated with relatively lower residual data energy.

Using the initial bit allocation and the motion estimation (e.g., as refined or not refined, based at least in part on pre-defined encoding criteria), the coder component can encode one or more coding units of the current raw video frame based at least in part on the reconstructed previous video frame. The reconstructed previous video frame can be used as a reference video frame for encoding the current raw video frame. In some implementations, after completing encoding of the one or more coding units, the coder component can dynamically adjust bit assignments for remaining coding units of the current raw video frame based at least in part on various information and factors. The information can include, for example, the residual data associated with the initial motion estimation in relation to the yet to be encoded coding unit(s), and/or identified real residual data and/or the real number of consumed bits associated with the encoded coding units, which the coder component can obtain from the encoding of the one or more coding units. For instance, the bits actually consumed during the encoding of the one or more coding units can be different than the number of bits that were estimated to be used for coding of the one or more coding units.

The coder component can dynamically adjust bit assignments for remaining coding units of the current raw video frame (e.g., using a bit assignment function) as a function of, for example, the difference between the actual bit consumption and previously estimated bit consumption for encoding the one or more coding units of the current raw video frame.

Referring now to the drawings, FIG. 1 illustrates a block diagram of an example system 100 that can efficiently allocate bits for a raw video frame to facilitate efficiently encoding the raw digital frame in accordance with various aspects and implementations described herein. The system 100 can include an encoder component 102 that encodes received digital media data (e.g., digital video content, audio content, still image, multimedia content, etc.) to produce encoded digital media data as an output. The encoder component 102 can encode or compress the digital media data in accordance with a predefined compression or encoding algorithm(s). The encoder component 102 can be a stand-alone unit, part of a codec, part of another component or unit, or can have portions of the encoder component 102 distributed in multiple components or units of the system 100.

In an exemplary embodiment, the encoder component 102 uses and dynamically manages multi-stage motion estimation to encode the digital media data. The encoder component 102 can manage the multi-stage motion estimation of raw video frames of a video in parallel to more efficiently use computing power (e.g., more efficiently use parallel data processing) to achieve more efficient (e.g., optimal) compression quality, for example.

In accordance with other exemplary embodiments, the encoder component 102 can control initial allocation of bits to coding units (e.g., blocks, macroblocks, etc.) of a raw video frame based at least in part on residual data energy associated with the initial motion estimation. After encoding a specified number of coding units of the raw video frame, the encoder component 102 can analyze actual residual data energy associated with the encoded coding units. The encoder component 102 can dynamically control adjusting allocation of bits to remaining coding units of the raw video frame based at least in part on the actual residual data energy associated with the encoded coding units of the raw video frame and the residual data energy (e.g. estimated or initial residual data energy from the initial motion estimation) associated with the remaining coding units of the raw video frame yet to be encoded. This disclosure often describes dynamically controlling bit allocation in relation to encoding coding units of a raw video frame; however, the aspects and implementations of this disclosure also can be used to dynamically control bit allocation for encoding video frame slices or other portions of a raw video frame as well.

The encoder component 102 can include an estimator component 104 that can generate or perform an initial motion estimation of a raw video frame (e.g., raw video frame$_N$) of a sequence of raw video frames (e.g., raw video frame$_1$, ..., raw video frame$_{N-2}$, raw video frame$_{N-1}$, raw video frame$_N$, raw video frame$_{N+1}$, raw video frame$_{N+2}$, ...) of video content based at least in part on a previous raw video frame (e.g., raw video frame$_{N-1}$) of the sequence. As part of the initial motion estimation, the estimator component 104 can generate a subset of motion vectors associated with the raw video frame (e.g., raw video frame$_N$). The estimator component 104 can use the previous raw video frame as a reference video frame, in relation to the raw video frame, when generating the initial motion estimation for the raw video frame. In some implementations, during encoding of the first raw video frame (e.g., raw video frame$_1$ when N=1) of the sequence, since there is no previous video frame, the encoder component 102 can encode the first raw video frame without performing motion estimation of the first raw video frame.

The encoder component 102 can include a coder component 106 that can encode raw video frames, including the previous raw video frame (e.g., raw video frame$_{N-1}$). As part of the encoding process, the coder component 106 also can generate a reconstructed previous video frame (e.g., reconstructed video frame$_{N-1}$). The encoding of the previous raw video frame (e.g., copy of the previous raw video frame) by the coder component 106 can be performed in parallel (e.g., simultaneously, substantially simultaneously, or concurrently) with the generation of the initial motion estimation by the estimator component 104.

In some implementations, as more fully disclosed herein, a plurality of processors (e.g., processing units) can be employed to process data and facilitate parallel processing of data. A first subset of the plurality of processors can be allocated to the estimator component 104, and a second subset of processors can be allocated to the coder component 106, to facilitate parallel operation and performance of the respective functions by the estimator component 104 and coder component 106. Depending in part on the number of available processors assigned to the estimator component 104, the estimator component 104 can generate or perform one initial motion estimation on a raw video frame at a time or multiple initial motion estimations on respective multiple raw video frames in parallel (e.g., simultaneously, substantially simultaneously, or concurrently). The estimator component 104 can generate or perform an initial motion estimation on a single slice (e.g., using a single core and/or processor) associated with a raw video frame at a given time or multiple initial motion estimations on respective multiple slices (e.g., using multiple cores and/or multiple processors) in parallel. Depending in part on the number of available processors assigned to the coder component 106, the coder component 106 can encode one raw video frame (and/or refine a motion estimation of a raw video frame) at a given time or can encode multiple raw video frames (and/or refine multiple motion estimations of respective raw video frames) in parallel (e.g., simultaneously, substantially simultaneously, or concurrently).

As part of the encoding process, the coder component 106 can encode the previous raw video frame to generate an encoded previous video frame (e.g., a coded bitstream for the previous video frame). The coder component 106 also can decode the encoded previous video frame to reconstruct the previous video frame to thereby generate a reconstructed previous video frame. The coder component 106 can use the reconstructed previous video frame as a reference video frame when encoding the raw video frame (e.g., raw video frame$_N$). When encoding the raw video frame, the coder component 106 can use the initial motion estimation without refinement, or can refine motion estimation of the raw video frame using the reconstructed previous video frame, in accordance with predefined encoding criterion, as more fully disclosed herein. The coder component 106 can use the initial motion estimation or refined motion estimation to encode the raw video frame, as more fully disclosed herein.

When the estimator component 104 generates the initial motion estimation for the raw video frame based at least in part on the previous raw video frame, residual data associated with the coding units of the raw video frame (e.g., initial residual data associated with the initial motion estimation) can be produced. The estimator component 104 and/or coder component 106 can obtain coding-related statistics, including statistics relating to the residual data, associated with the coding units of the raw video frame. The statistics relating to residual data can be represented, for example, by energy of the residual data of the coding units. In some implementations, the coder component 106 can determine (e.g., calculate) the energy of the residual data of the coding units as a function of the value of the residual data in the coding units of the raw video frame. For example, the coder component can calculate the energy of the residual data in the coding units as the sum of the absolute value of the residual data in the respective coding units of the raw video frame, based at least in part on the initial motion estimation of the raw video frame. The residual data energy values can be available to the coder component 106 during motion searching.

The coder component 106 can analyze the coding-related statistics, including statistics relating to that residual data, for the coding units of the raw video frame in relation to the initial motion estimation, the targeted total bit count for encoding the raw video frame or slice, and/or other factors, and can apply predefined encoding criterion. The predefined encoding criterion can relate to, for example available computing resources in relation to a raw video frame, residual data associated with a raw video frame, number of available bits for encoding of a raw video frame, number of actual bits consumed during encoding of a subset of coding units of a raw video frame, number of coding units to be encoded for a raw video frame (or portion thereof), bandwidth requirements or constraints relevant to a raw video frame, media content complexity associated with a raw video frame, statistical information relating to previously encoded data, an encoding algorithm, a function associated with bit allocation for a raw video frame, level of granularity applied to a range of residual data energy in relation to bit allocation for a raw video frame, encoding-related factors (e.g., as disclosed herein), respective weighting applicable to the encoding-related factors, etc.

Based at least in part on the results of the analysis, the coder component 106 can identify and assign respective initial subsets of bits to coding units of the current raw video frame. The coder component 106 can determine (e.g., calculate) a number of bits to assign to a coding unit for encoding (e.g., using a bit assignment function) as a function of the residual data energy associated with the coding unit in relation to the respective residual data energy of other coding units of the raw video frame. The function (e.g., bit assignment function) can be, for instance, a curve of assigned bits against characteristics of residual data, e.g., the residual data energy. For example, in accordance with a bit allocation algorithm, the coder component 106 can assign more bits to coding units associated with higher residual data energy and a lesser number of bits to coding units associated with relatively lower residual data energy. The function can be obtained from offline experiments or other previous knowledge (e.g., previous information relating to encoding data) and/or can be identified dynamically based at least in part on accumulated information relating to encoding data (e.g., coding-related statistics relating to prior encoding of video frames).

Using the initial bit allocation and the motion estimation (e.g., as refined or not refined, in accordance with the predefined encoding criterion), the coder component 106 can encode a subset of the coding units (e.g., one or more coding units) of the raw video frame based at least in part on the reconstructed previous video frame. The coder component 106 can use the reconstructed previous video frame as a reference video frame for encoding the current raw video frame. In some implementations, after completing encoding of the subset of coding units, the coder component 106 can obtain coding-related statistics, such as statistics relating to the actual residual data, associated with the subset of coding units of the raw video frame.

The coder component 106 can analyze the coding-related statistics, including the statistics relating to that actual residual data, for the subset of coding units of the raw video frame in relation to encoding the subset of coding units, the remaining bit count for encoding the remainder of the raw video frame, the initial or estimated residual data associated with the remaining coding units, and/or other information or factors. As part of the analysis, the coder component 106 also can apply predefined encoding criterion (or corresponding predefined encoding rule(s) and/or an encoding algorithm, which can be or can include a bit allocation algorithm) to the data under analysis. Based at least in part on the results of this analysis, the coder component 106 can dynamically adjust bit assignments for the remaining coding units of the raw video frame based at least in part on the initial or estimated residual data associated with the remaining coding units and the remaining bit count. In some instances, during encoding of the subset of coding units, the bits actually consumed during the encoding can be different than the number of bits that were estimated to be used and/or initially assigned for coding of the subset of coding units based on the initial motion estimation for the raw video frame. The coder component 106 can dynamically adjust bit assignments for remaining coding units of the raw video frame as a function of the actual bit consumption associated with encoding the subset of coding units of the raw video frame. For example, the coder component 106, using a bit assignment function, can calculate the difference between the actual bit consumption and previously estimated bit consumption for encoding the subset of coding units, or the difference between the original total number of bits and the actual bit consumption, to identify the remaining bits available to encode the remaining coding units of the raw video frame. The coder component 106 can dynamically adjust bit assignments for the remaining coding units based at least in part on the remaining bits available, and the initial or estimated residual data associated with the remaining coding units as derived from the initial motion estimation by the coder component 106.

The coder component 106 can continue encoding the remaining coding units, or a subset of the remaining coding units, of the raw video frame using the respective number of bits assigned to respective coding units in accordance with the adjusted bit allocation. In some implementations, the coder component 106 can code the subset of remaining coding units and again dynamically adjust bit assignments for any remaining (unencoded) coding units of the raw video frame (e.g., using a bit assignment function) as a function of the real residual data associated with the encoded subset of remaining coding units, in accordance with a desired bit allocation algorithm.

As disclosed herein, the number of bits assigned to a coding unit for encoding can be determined (e.g., calculated) as a function of the residual data energy associated with the coding unit in relation to the respective residual data energy of other coding units of the raw video frame. The function (e.g., bit assignment function) can be, for instance, a curve of assigned bits against characteristics of residual data, e.g., the residual data energy.

To facilitate reducing complexity, the level of granularity used to make determinations regarding bit allocation in accordance with the function can be varied, as desired, in accordance with a desired bit allocation algorithm. For instance, a lower level of granularity can reduce complexity relative to the complexity involved when using a higher level of granularity. In some implementations, the coder component 106 can divide the range of residual data energy into a number of segments, wherein each segment can be associated with a different bit assignment or different bit assignment factor. For example, a first segment associated with lower levels of residual data energy can be related to a lower number of assigned bits; a second segment associated with middle levels of residual data energy can be related to a medium number of assigned bits; and a third segment associated with higher levels of residual data energy can be related to a higher number of assigned bits. The medium number can be greater than the lower number, and the higher number can be greater than the medium and lower numbers.

Typically, the smaller the segments, the higher level of granularity and complexity; and the larger the segments, the lower the level of granularity and complexity. By dividing the range of residual data energy into a number of segments, bit allocation can be less sensitive to prediction noise, as the initial motion estimation is based on raw video frame data and not reconstructed previous video frame data.

As disclosed herein, the coder component 106 can evaluate coding-related statistics, including statistics relating to residual data, for the coding units of the raw video frame in relation to the initial motion estimation, the targeted total bit count for encoding the raw video frame or slice, and/or other factors, in relation to determining bit allocation for coding units of the raw video frame. The other factors can include, for example, the maximum value of the residual data in the coding unit and/or the deviation of the residual data in the coding unit. Each factor can have a role (e.g., respectively weighted role) in determining how bits are allocated by the coder component 106.

In some implementations, the coder component 106 can determine bit allocation for encoding coding units of a raw video frame based at least in part on a complexity score relating to all or a portion of these various factors, in accordance with a bit allocation algorithm. The coder component 106 can assign each code unit a score of complexity (e.g., a complexity score of 1). The coder component 106 can adjust (e.g., increase, decrease) the complexity score for a coding unit in relation to each factor. In certain implementations, the coder component 106 can add or subtract a certain amount to or from the complexity score of the coding unit. For example, the coder component 106 can add a certain amount to the complexity score when there is a relatively higher energy of residual data, but, when considering deviation, the coder component 106 can reduce the complexity score by a specified amount when a relatively low deviation is identified. For each coding unit of the raw video frame, after the coder component 106 has adjusted the complexity score for the coding unit based at least in part on (e.g., after accounting for all) applicable factors, the coder component 106 can assign a final complexity score to that coding unit in accordance with the adjustments made to the complexity score based on the applicable factors.

After each of the coding units of the raw video frame has its respective final complexity score, the coder component 106 can allocate bits to respective coding units of the raw video frame based at least in part on the respective final complexity scores of the coding units. In some implementations, the coder component 106 can use a bit allocation function to allocate bits to a coding unit as a function of (e.g., as a ratio of) its complexity score in relation to the total complexity score of all of the coding units of the raw video frame. For example, the coding units can have respective complexity scores $s1, s2, s3, \ldots, sn$, wherein n can be an integer number corresponding to the number of coding units (or remaining coding units to be encoded) in a raw video frame. The target bit count (or remaining bit count) can be identified as total_bits (or total_remaining_bits). The coder component 106 can allocate a bit count, represented as allocated_bit_count, for a coding unit of the raw video frame in accordance with the equation (e.g., bit allocation function or algorithm): allocated_bit_count [i]=total_bits*si/total_score, for i=1, 2, 3, ..., n, wherein total_score=s1+s2+s3+ ... +sn.

After a subset of coding units of the raw video frame has been encoded, the coder component 106 can dynamically adjust bit allocation for remaining coding units (e.g., coding units yet to be encoded) of the raw video frame. For example, the coder component 106 can dynamically adjust bit allocation for the remaining coding units in accordance with the equation (e.g., bit allocation function or algorithm): allocated_bit_count [i]=total_remaining_bits*si/total_remaining_score, wherein total_remaining_score=s(j+1)+s(j+2)+ ... +sn, wherein i=j+1, j+2, ..., n, and wherein j can be an integer number representing the number of coding units of the raw video frame that already have been encoded.

The techniques employed in this disclosure can provide for more efficient (e.g., maximal, optimal) allocation and use of available bits for encoding of a raw frame as compared to conventional systems or methods for allocating bits for encoding of video frames. The coder component 106 can allocate a suitable (e.g., reasonable) number of bits to each coding unit for encoding based at least in part on the complexity of the coding unit, which can thereby preserve video quality while efficiently encoding the video.

While implementations and aspects of this disclosure are described herein with regard to coding units, this disclosure is not so limited. For example, the implementations and aspects disclosed herein in relation to coding units can be used (e.g., applied) in relation to various types of units or regions of a video frame, such as, for example, blocks, macroblocks, sub-macroblocks, motion granularity units, and/or other types of image compression units, and these various types of image compression units are within the scope of this disclosure.

Figure 2:
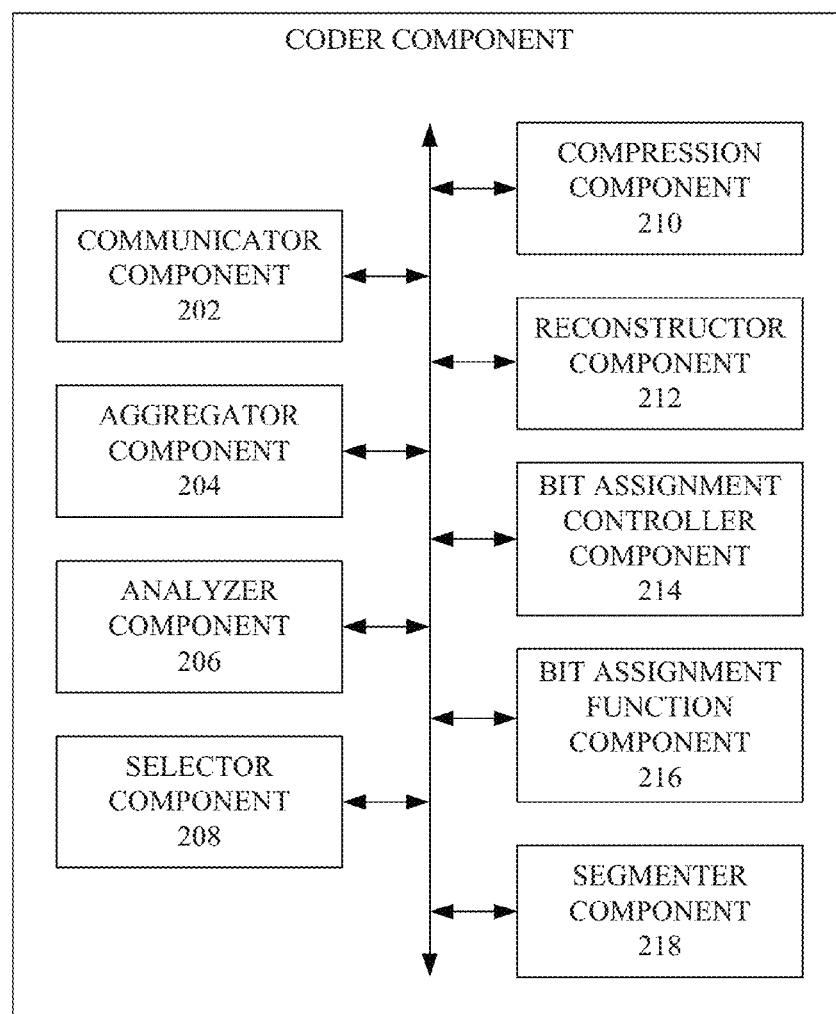
FIG. 2 illustrates a diagram of an example coder component in accordance with various aspects and implementations of this disclosure.

FIG. 2 illustrates a diagram of an example coder component 200 in accordance with various aspects and implementations of this disclosure. The coder component 200 can include a communicator component 202 that can be used to communicate (e.g., transmit, receive) information, including information that can facilitate encoding data for raw video frames. For example, the information can include information that can facilitate enabling the coder component 200 to allocate (e.g., dynamically or automatically) bits to coding units of a raw video frame, determine whether to refine an initial motion estimation relating to a raw video frame, refine a motion estimations for a raw video frame, etc.

The coder component 200 can contain an aggregator component 204 that can aggregate data received (e.g., obtained) from various entities (e.g., processor, data store, estimator component, resource controller component, user interface, etc.). The aggregator component 204 can correlate respective items of data based at least in part on type of data, source of the data, time or date the data was generated or received, encoding state of the data, a video frame or coding unit to which the data relates, etc., to facilitate analyzing of the data by an analyzer component 206.

The coder component 200 can include the analyzer component 206 that can analyze data relating to encoding data, allocation of bits to coding units for encoding of raw video frames, and/or refining motion estimations for raw video frames, etc., and can generate analysis results, based at least in part on the data analysis. For example, the analyzer component 206 that can analyze residual data associated with an initial motion estimation of coding units of a raw video frame or slice and/or calculate residual data energy associated with the coding units to facilitate determining an initial allocation of bits among the coding units for encoding. As another example, after a subset of coding units have been encoded, the analyzer component 206 can analyze real residual data associated with encoding of the subset of coding units of the raw video frame or slice to facilitate determining (e.g., dynamically) a re-allocation of remaining bits among the remaining coding units yet to be encoded. The coder component 200 can use the analysis results to facilitate enabling the coder component 200 to efficiently encode raw video frames of a video.

The coder component 200 also can contain a selector component 208 that can select items of data, an applicable encoding-related algorithm (e.g., encoding algorithm, bit allocation algorithm, motion estimation refinement algorithm, etc.), a coding unit of a raw video frame, or other information, to facilitate encoding data, allocating bits for encoding of coding units of a raw video frame, and/or refining a motion estimation for a raw video frame, etc. For example, the selector component 208 can select one or more parameters, one or more items of data, etc., relevant to an encoding task being performed by the coder component 200.

The coder component 200 can include a compression component 210 that can encode or compress data associated with a video frame in accordance with a predefined compression or encoding algorithm. The compression component 210 can use a specified quantization value that can correspond to the compression level to be used during the encoding of the raw video frame. In some implementations, the coder component 200 can contain a reconstructor component 212 that can decode (e.g., decompress using a decompression or decoding algorithm) an encoded video frame (e.g., previous video frame) and can reconstruct the video frame for use, for example, as a reference video frame during refinement of a motion estimation of a current video frame or encoding of the current video frame.

The coder component 200 can include a bit assignment controller component 214 that can assign (e.g., dynamically or automatically) respective subsets of bits to respective coding units of a raw video frame being encoded, in accordance with at least one predefined encoding criterion, as more fully disclosed herein. The bit assignment controller component 214 also can set or adjust parameters relating to assigning bits to respective coding units to facilitate desired bit assignment and encoding the raw video frame. The coder component 200 also can include a bit assignment function component 216 that can comprise one or more bit assignment functions, as disclosed herein, that can facilitate determining (e.g., calculating) the number of bits to be assigned to a coding unit of a raw video frame, in accordance with one or more respective bit allocation algorithms. The bit assignment controller component 214 can use the bit assignment function component 216 to facilitate assigning respective subsets of bits to respective coding units of the raw video frame.

The coder component 200 further can contain a segmenter component 218 that can divide a residual data energy range into a desired number of segments representing respective portions of the entire residual data energy range. Each segment can be associated with a respective bit assignment and/or bit assignment factor, as more fully disclosed herein.

Figure 4:
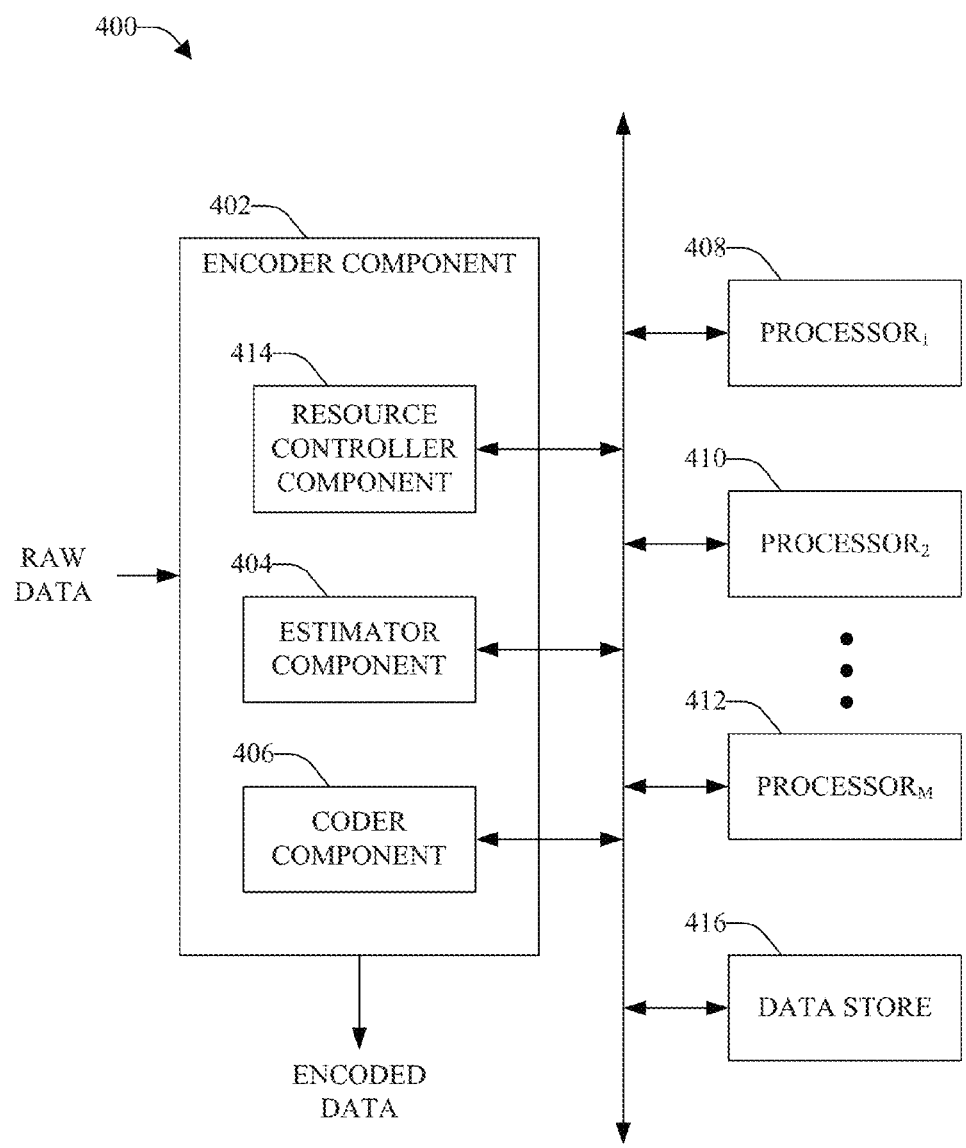
FIG. 4 illustrates a diagram of an example system that can allocate (e.g., dynamically and/or automatically) system resources to facilitate efficient encoding of digital video data in accordance with various aspects and implementations of this disclosure.

The coder component 200 can contain, or can be associated with (e.g., communicatively connected to), one or more processors (not shown in FIG. 2; as depicted in FIG. 4) that can process data relating to encoding data, assigning bits to coding units of a raw video frame for use in encoding the frame, and/or refining motion estimations for raw video frames, as more fully disclosed herein. The coder component 200 can include, or can be associated with (e.g., communicatively connected to), one or more data stores (not shown in FIG. 2;

as depicted in FIG. 4) that can receive, store, and/or provide data relating to encoding data, bit allocation, and/or refining motion estimations for raw video frames, as more fully disclosed herein.

Figure 3:
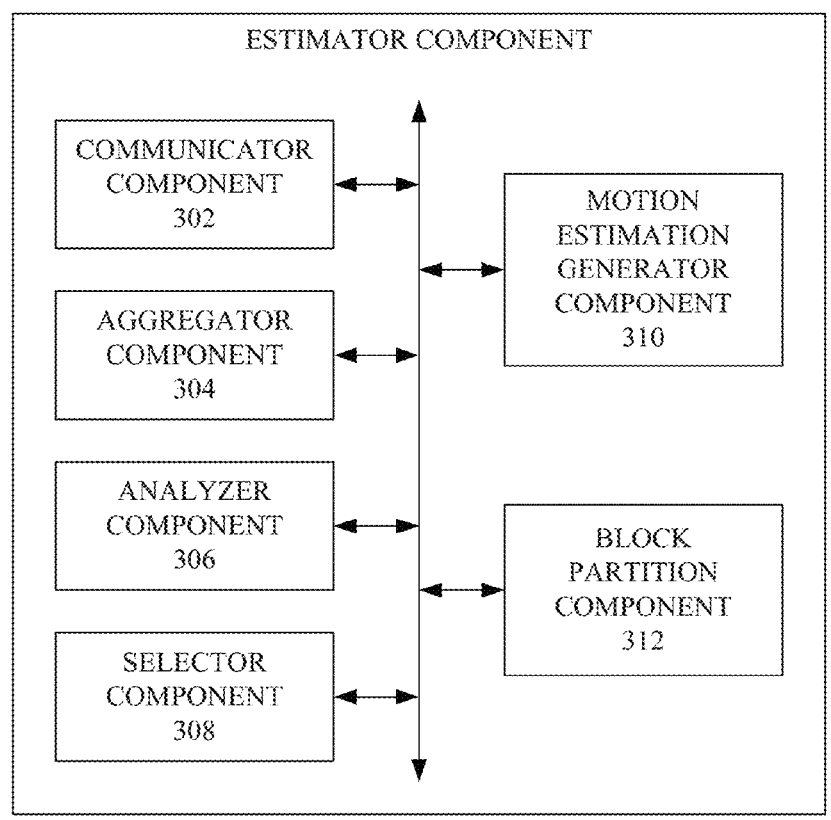
FIG. 3 depicts a block diagram of an example estimator component in accordance with various aspects and implementations of this disclosure.

FIG. 3 depicts a block diagram of an example estimator component 300 in accordance with various aspects and implementations of this disclosure. The estimator component 300 can include a communicator component 302 that can be used to communicate (e.g., transmit, receive) information, including information relating to generating motion estimations, bit allocation for raw video frames, and/or encoding data for raw video frames.

The estimator component 300 can contain an aggregator component 304 that can aggregate data received (e.g., obtained) from various entities (e.g., processor, data store, coder component, resource controller component, user interface, etc.). The aggregator component 304 can correlate respective items of data based at least in part on type of data, source of the data, time or date the data was generated or received, encoding state of the data, a video frame to which the data relates, etc., to facilitate analyzing the data.

The estimator component 300 can include an analyzer component 306 that can analyze data relating to generating motion estimations and encoding data for raw video frames, and can generate analysis results, based at least in part on the data analysis, to facilitate enabling the estimator component 300 to generate an initial motion estimation, including generating a subset of initial motion vectors, for a raw video frame. The estimator component 300 also can contain a selector component 308 that can select items of data, an applicable encoding-related algorithm (e.g., motion estimation algorithm), a coding unit (e.g., block, macroblock, etc.) of a raw video frame, or other information, to facilitate generating motion estimation and/or encoding data for a raw video frame.

The estimator component 300 can include a motion estimation generator component 310 that can generate a motion estimation, such as an initial motion estimation, of a raw video frame, for example, based at least in part on a previous raw video frame, as more fully disclosed herein. The motion estimation generator component 310 can generate respective motion estimations and/or respective subsets of motion vectors for respective coding units of the raw video frame. For example, the motion estimation generator component 310 can generate a first subset of initial motion vectors for a first coding unit of a raw video frame, and a second subset of initial motion vectors for a second coding unit of the raw video frame, based at least in part on the previous raw video frame.

The estimator component 300 can contain a block partition component 312 that can partition, divide, or segment a raw video frame into a set of coding units or frame slices, wherein each coding unit or frame slice in the set can encompass a respective portion of the raw video frame. The block partition component 312 can adjust partition parameters to adjust the size or shape of the coding unit, for example, in response to a command to modify the size or shape of the coding unit.

The estimator component 300 can contain, or can be associated with (e.g., communicatively connected to), one or more processors (not shown in FIG. 3; as depicted in FIG. 4) that can process data relating to encoding data, allocating bits for encoding coding units, and/or generating initial motion estimations for raw video frames, as more fully disclosed herein. The estimator component 300 also can include, or can be associated with (e.g., communicatively connected to), one or more data stores (not shown in FIG. 3; as depicted in FIG. 4) that can receive, store, and/or provide data relating to encoding data, allocating bits for encoding coding units, and/ or generating initial motion estimations for raw video frames, as more fully disclosed herein.

FIG. 4 depicts a block diagram of an example system 400 (e.g., video processing system) that can allocate (e.g., dynamically and/or automatically) system resources to facilitate efficient encoding of digital video data in accordance with various aspects and implementations of this disclosure. The system 400 can contain an encoder component 402 that can encode data (e.g., digital media data) associated with content (e.g., video content), as more fully disclosed herein. The encoder component 402 can include an estimator component 404 that can generate or perform at least an initial motion estimation of a raw video frame of a sequence of raw video frames of a video, in accordance with the at least one predefined criterion, as more fully disclosed herein. The encoder component 402 can further include a coder component 406 that can encode the raw video frame.

In some implementations, the coder component 406 can determine (e.g., automatically and/or dynamically) whether to refine the initial motion estimation of the raw video frame and/or how to use the subset of initial motion vectors of the initial motion estimation when encoding the raw video frame, in accordance with the at least one predefined criterion, as more fully disclosed herein. In other implementations, the coder component 406 can control initial allocation of bits to coding units of a raw video frame based at least in part on residual data energy associated with the initial motion estimation associated with the raw video frame. The coder component 406 can encode a specified number of coding units of the raw video frame. After encoding the specified number of coding units of the raw video frame, the coder component 406 can analyze real residual data energy associated with the encoded coding units. The coder component 406 can dynamically control adjusting allocation of bits to remaining coding units of the raw video frame based at least in part on the real residual data energy associated with the encoded coding units of the raw video frame and the residual data energy (e.g. estimated or initial residual data energy from the initial motion estimation) associated with the remaining coding units of the raw video frame yet to be encoded.

The system 400 can include a plurality of processors (e.g., processing units), including processor$_1$ 408, and processor$_2$ 410 through processor$_M$ 412, wherein M can be virtually any desired integer number. A processor of the plurality of processors can be a typical applications processor, or an application-specific (e.g., encoding-specific) processor, that can be used to process data, such as video or audio data, to facilitate encoding data, assigning bits to coding units, or performing other operations (e.g., analyzing data, decoding data, reconstructing video frames, communicating data, etc.) on data.

The encoder component 402 also can contain a resource controller component 414 that can automatically and/or dynamically allocate, assign, or distribute respective processors of the plurality of processors to the estimator component 404 and coder component 406, respectively, at various times. The resource controller component 414 can analyze information relating to encoding the raw video frames of the video, and can use or apply a predefined resource allocation algorithm in relation to the information to determine an appropriate (e.g., efficient, optimal) apportionment of the processors among the estimator component 404, the coder component 406, or other components associated with the system 400, based at least in part on a set or subset of encoding-related information or factors, including, for example, the total available computing resources, media content complexity, statistical information relating to previously encoded data, at least one predefined encoding criterion, and/or other information or factors.

Based at least in part on the results of the analysis, the resource controller component 414 can dynamically allocate, assign, or distribute a first subset of processors (e.g., processor$_1$ 408 and/or one or more other available processors) of the plurality of processors to the estimator component 404 and a second subset of processors (processor$_2$ 410 and/or one or more other available processors) of the plurality of processors to the coder component 406 to facilitate parallel processing of the digital media data (e.g., video frames) to efficiently encode such data. The resource controller component 414 can monitor and/or analyze encoding operations relating to encoding the video on a continuous basis, periodic basis (e.g., at predefined time intervals), and/or in response to receiving information regarding operating conditions relating to the encoding operations. Based at least in part on the results of the analysis of the encoding operations and/or historical information relating to video encoding, the resource controller component 414 can dynamically set or modify the respective allocations of processors to the estimator component 404, coder component 406, and/or other components of system 400, in accordance with the at least one predefined encoding criterion.

The resource controller component 414 can analyze information, including encoding-related statistics, relating to encoding a subset of video frames (e.g., raw video frame, previous raw video frame) of the video to generate analysis results. In certain instances, the analysis results can indicate generation of the initial motion estimation for a raw video frame by the estimator component 404 is expected (e.g., predicted) to take less time than the remainder of the coding operations to encode a previous raw frame, which is to be performed by the coder component 406. Based at least in part on such analysis results and at least one predefined encoding criterion, the resource controller component 414 can determine that a smaller number of processors (and/or a smaller amount of processing resources) is to be allocated to the estimator component 404 than the number of processors (and/or the amount of processing resources), which would have been allocated to the estimator component 404, had the analysis results indicated initial motion estimation of the raw video frame would take the same amount of time as, or more time than, the remainder of the coding operations to encode the previous raw frame, which is to be performed by the coder component 406.

In some instances, the analysis results may indicate that generation of the initial motion estimation for the raw video frame is expected to take the same amount of time or more time than the remainder of the coding operations to code the previous raw frame. In such instances, the resource controller component 414 can allocate a larger number of processors (and/or a larger amount of processing resources) to the estimator component 404 than the number of processors (and/or amount of processing resources) allocated to the estimator component 404 when the analysis results indicate the initial motion estimation for the raw video frame by the estimator component 404 is expected to take less time than the remainder of the coding operations to encode the previous raw frame. For example, in such instances, the resource controller component 414 can allocate a number of processors (and/or an amount of processing resources) to the estimator component 404 that is equal to or greater than the number of processors (and/or the amount of processing resources) allocated to the coder component 406.

A processor (e.g., processor$_1$ 408, and processor$_2$ 410, processor 412) can operate in conjunction with the other components (e.g., encoder component 402, estimator component 404, coder component 406, etc.) of the system 400 to facilitate performing the various functions of the system 400. The processor can employ one or more processors, microprocessors, or controllers that can process data, such as information relating to encoding or compressing data, analyzing data, allocating (e.g., dynamically or automatically) bits for encoding of coding units, quantizing data, sampling data, selecting data, applying an encoding-related algorithm, etc., information relating to other operations of the system 400, and/or other information. The processor(s) can thereby facilitate operation of the system 400, as more fully disclosed herein, and control data flow between the system 400 and other components (e.g., communication device from which the video is received, communication device to which the encoded video is to be transmitted, etc.) associated with the system 400.

The system 400 can include one or more data stores (e.g., a data store 416) that can store data structures (e.g., encoding-related data, user data, metadata), code structure(s) (e.g., modules, objects, hashes, classes, procedures) or instructions. The data store 416 also can store information relating to encoding or compressing data (e.g., encoding or compression algorithm(s)), decoding or decompressing data (e.g., decoding or decompression algorithm(s)), analyzing data, allocating bits for encoding of coding units, quantizing data, sampling data, selecting data, applying an encoding-related algorithm, etc., information relating to other operations of the system 400, and/or other information. The data structures, code structures, instruction, or other information stored in the one or more data stores (e.g., data store 416) can be used to facilitate controlling operations associated with the system 400. One or more processors (e.g., processor$_1$ 408, and processor$_2$ 410, processor$_M$ 412) can be functionally coupled (e.g., through a memory bus) to the one or more data stores (e.g., data store 416) in order to store and retrieve information desired to operate and/or confer functionality, at least in part, to the components of the system 400 (e.g., encoder component 402, estimator component 404, coder component 406, etc.), and/or substantially any other operational aspects of the system 400.

It is to be appreciated and understood that, while three processors are depicted in FIG. 4, this disclosure is not so limited. In accordance with various implementations, the system 400 can contain less than three processors, three processors, or more than three processors, as desired.

Figure 5:
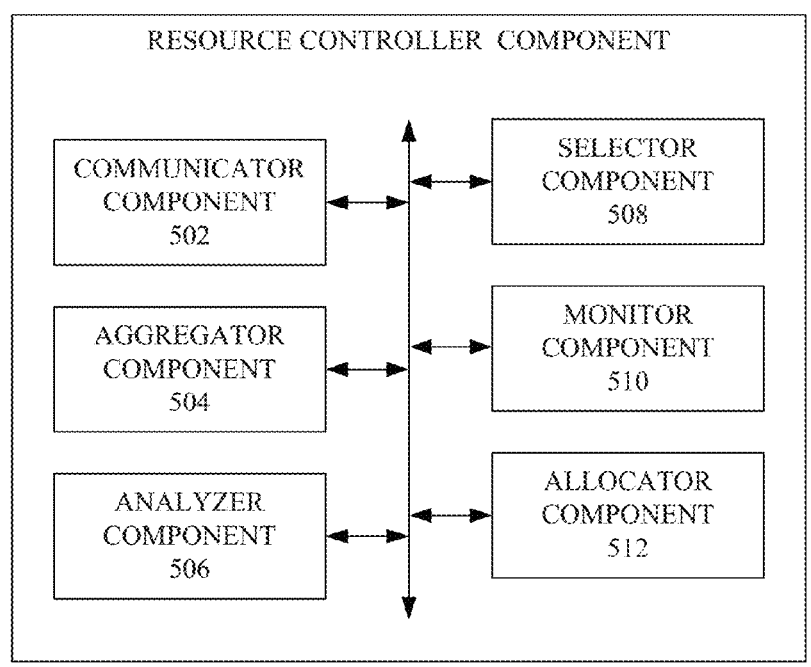
FIG. 5 presents a diagram of an example resource controller component in accordance with various aspects of this disclosure.

FIG. 5 presents a diagram of an example resource controller component 500 in accordance with various aspects of this disclosure. The resource controller component 500 can comprise a communicator component 502 that can be used to communicate (e.g., transmit, receive) information, including information that can facilitate controlling resource allocation, including processor allocation, among various components, including an estimator component and coder component, to facilitate encoding of data.

The resource controller component 500 can contain an aggregator component 504 that can aggregate data received (e.g., obtained) from various entities (e.g., processor, data store, estimator component, coder component, user interface, etc.). The aggregator component 504 can correlate respective items of data based at least in part on type of data (e.g., statistics relating to previously encoded data (e.g. previously encoded coding units), resource related data, etc.), source of the data, time or date the data was generated or received, etc., to facilitate analyzing of the data by an analyzer component

506. For example, the aggregator component 504 also can obtain, aggregate, and correlate statistics relating to previously encoded coding units of a raw video frame and/or previously encoded video frames. Those statistics can be used by the resource controller component 500 to facilitate rendering decisions on resource allocation during future encoding of video frames or portions thereof (e.g., coding units).

The resource controller component 500 can include the analyzer component 506 that can analyze data relating to allocating resources to various components (e.g., estimator component, coder component, etc.) to facilitate encoding data, allocating bits (e.g., dynamically or automatically) for encoding coding units of raw video frames, and/or refining motion estimations for raw video frames. For example, the analyzer component 506 can analyze information (e.g., statistics) relating to previously encoded video frames, information (e.g., statistics) relating to motion estimation and/or refinement of motion estimation, information (e.g., statistics) relating to assigning bits to coding units of a raw video frame for encoding, information regarding available resources (e.g., available processors, available computing cycles, available bandwidth, etc.), and/or other information, to facilitate determining or identifying an efficient (e.g., most efficient, optimal) allocation of resources for encoding of data. The analyzer component 506 can generate analysis results, based at least in part on the data analysis, to facilitate enabling the resource controller component 500 to efficiently and dynamically allocate resources to the various components during the encoding process. The resource controller component 500 also can contain a selector component 508 that can select items of data, an applicable encoding-related algorithm (e.g., resource allocation algorithm), or other information, to facilitate allocating resources to the various components during the encoding process.

In still other aspects, the resource controller component 500 can include a monitor component 510 that can monitor and/or detect conditions associated with the encoding process. The monitor component 510 can monitor and/or detect conditions, including, for example, parameter values relating to encoding, available processors, available computing cycles of respective processors, available amount of time to perform a particular encoding task, an amount of bandwidth for transmission of video, respective statuses of encoding for respective video frames (e.g., raw video frames), status of the estimator component, status of the coder component, and/or other conditions relating to encoding of a sequence of video frames.

The resource controller component 500 can use (e.g., analyze) the information relating to the conditions associated with the encoding process to facilitate determining an appropriate allocation of resources at a given time. In some implementations, the resource controller component 500 can contain an allocator component 512 that can allocate resources to various components, including the estimator component and coder component, associated with the encoding process, based at least in part on the analysis results from the analyzer component 506 and the at least one predefined encoding criterion. The resources can include, for example, processors, computing cycles of respective processors, and/or other resources (e.g., computing-related resources, memory resources, etc.). The allocator component 512, via the communicator component 502, can transmit command information to respective processors to facilitate allocating the respective processors or computing cycles of the respective processors, or allocating other resources, to the various components, including the estimator component and coder component.

The resource controller component 500 can contain, or can be associated with (e.g., communicatively connected to), one or more processors (not shown in FIG. 5; as depicted in FIG. 4) that can process data relating to resource allocation for encoding of data, as more fully disclosed herein. The resource controller component 500 also can include, or can be associated with (e.g., communicatively connected to), one or more data stores (not shown in FIG. 5; as depicted in FIG. 4) that can receive, store, and/or provide data relating to resource allocation for encoding of data, as more fully disclosed herein.

The coder component 200, estimator component 300, and resource controller component 500 each disclose respective communicator components (e.g., 202, 302, 502), aggregator components (e.g., 204, 304, 504), analyzer components (e.g., 206, 306, 506), and selector components (e.g., 208, 308, 508), among other components disclosed herein. While these components (e.g., communicator components, aggregator components, analyzer components, selector components) are disclosed herein as being separate components, this disclosure is not so limited. In some implementations, the encoder component (e.g., 102, 402) and/or coder component 200, the estimator component 300, and/or resource controller component 500 associated with the encoder component, can use (e.g., share use of) the same component(s) (e.g., communicator component, aggregator component, analyzer component, selector component). In certain implementations, a particular component(s) (e.g., communicator component, aggregator component, analyzer component, selector component) can reside outside of the coder component 200, estimator component 300, and/or resource controller component 500 (e.g., as a stand-alone component, or a separate component within the encoder component), or can be distributed among a number of components (e.g., can at least partially reside in one or more other components).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
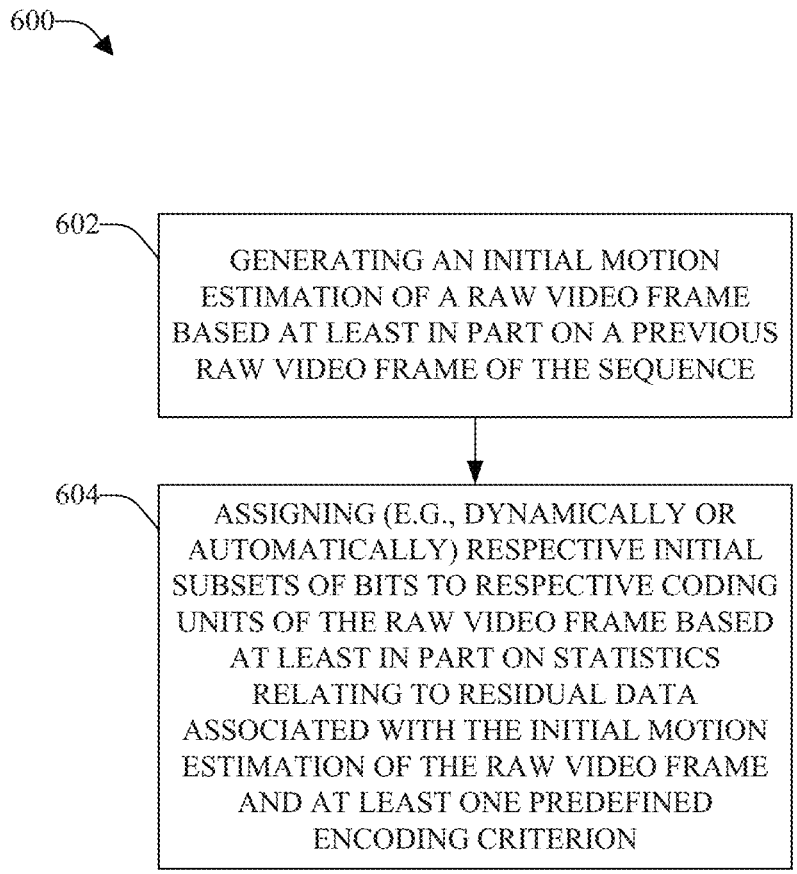
FIG. 6 presents a flow diagram of an example method for assigning (e.g., dynamically or automatically) bits to coding units of a raw video frame of a video frame sequence to facilitate encoding the raw video frame, in accordance with various aspects and implementations.
Figure 7:
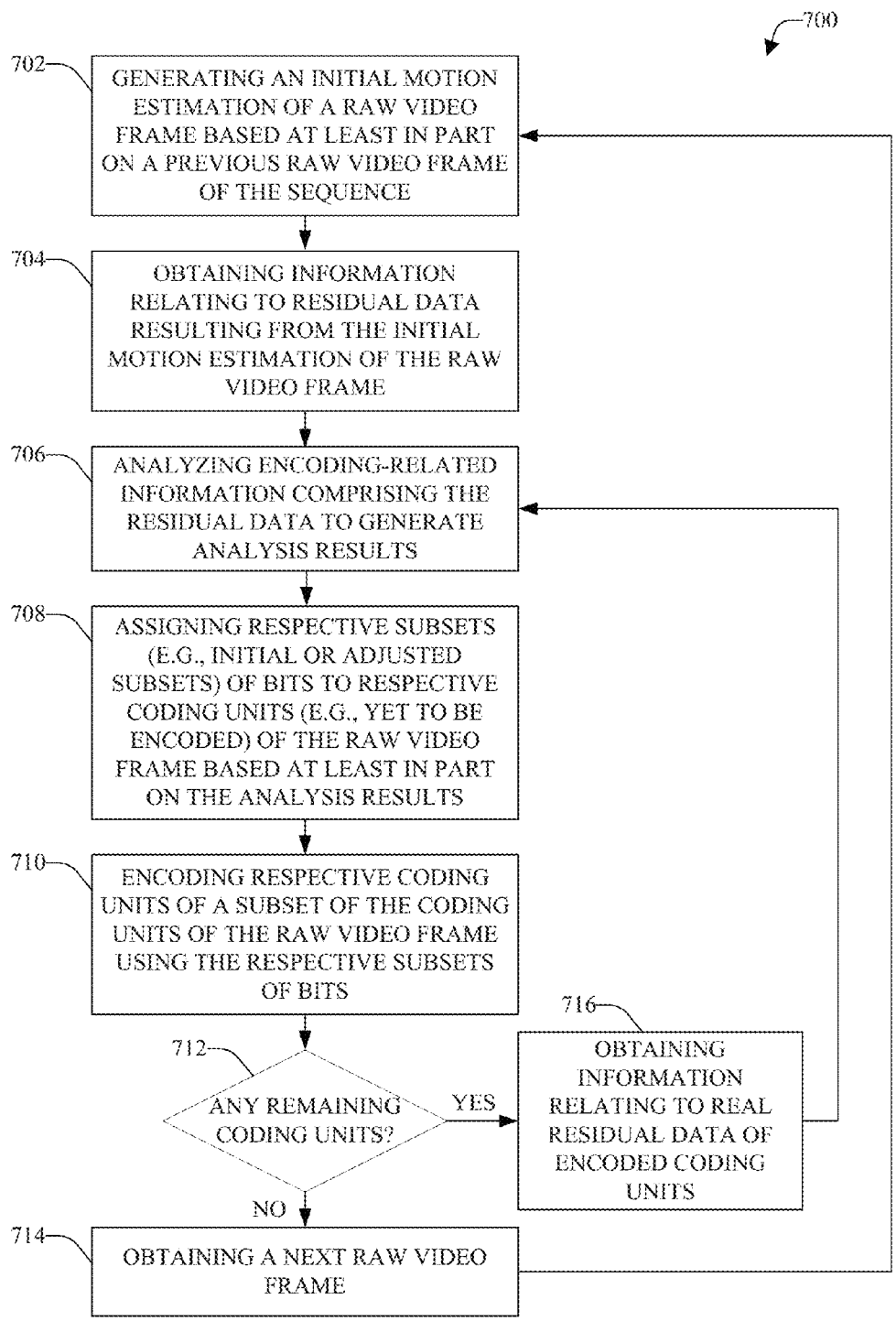
FIG. 7 depicts a flow chart of another example method for assigning (e.g., dynamically or automatically) bits to coding units of a raw video frame of a video frame sequence to facilitate encoding the raw video frame, in accordance with various aspects and implementations.
Figure 8:
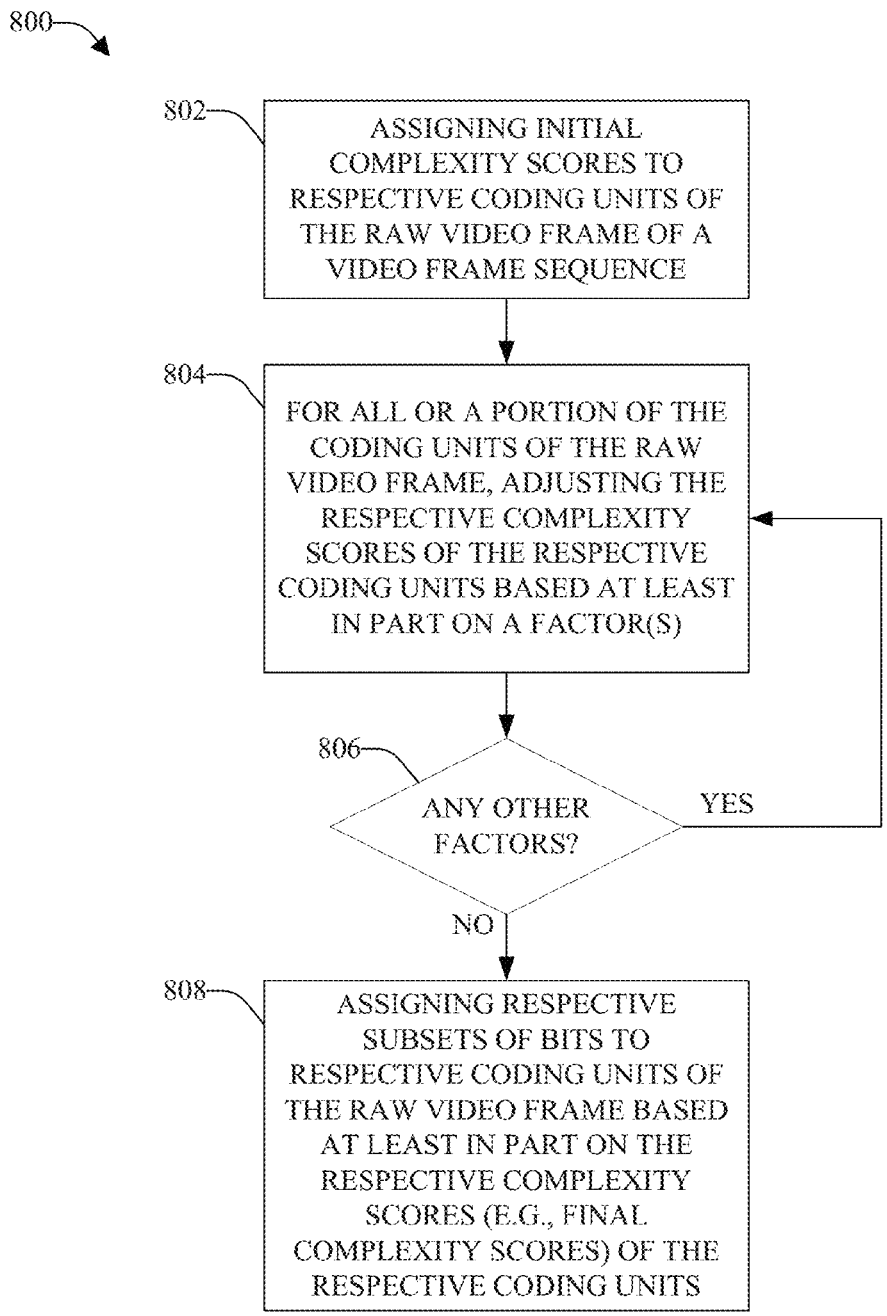
FIG. 8 illustrates a flow chart of an example method for calculating complexity scores for coding units of a raw video frame to facilitate bit assignment (e.g., dynamic or automatic) for efficient encoding of data, in accordance with various aspects and implementations.

In view of the example systems, components, and devices described above, example methods that can be implemented in accordance with this disclosure can be better appreciated with reference to flowcharts in FIGS. 6-8. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

With reference first to FIG. 6, illustrated is a flow chart of an example method 600 for assigning (e.g., dynamically or automatically) bits to coding units of a raw video frame of a video frame sequence to facilitate encoding the raw video frame, in accordance with various aspects and implementations. The method 600 can be used, for example, by an encoder component, which can include an estimator component and coder component.

At 602, an initial motion estimation of a raw video frame can be generated (e.g., using an estimator component) based at least in part on a previous raw video frame of the sequence. For example, when a new raw video frame is received by a video encoder, motion estimation (e.g., initial motion estimation) can be performed using a previous raw video frame (e.g., the selected reference frame). The raw video frame and the previous raw video frame can be part of a sequence of raw video frames of a video to be encoded. The motion estimation can be performed on one core (single slice) or multiple cores (multiple slices), based on number of available processing units. Simultaneously, substantially simultaneously or concurrently, some other processing units can be performing other coding functions (e.g., tasks) for video encoding the previous raw video frame. The distribution of processing units between motion estimation and other coding functions can be dynamically determined based on, for example, content complexity, available processing units, statistics of previously encoded data, or other factors or criterion. For example, if statistics show that motion estimation generally takes less time than the rest of the coding tasks (such as may occur in a video conferencing application), a smaller number of processing units can be assigned to motion estimation.

At 604, respective initial subsets of bits can be assigned (e.g., dynamically or automatically) to respective coding units of the raw video frame based at least in part on statistics relating to residual data associated with the initial motion estimation of the raw video frame and at least one predefined encoding criterion. A coder component can analyze statistical information relating to the initial motion estimation of the raw video frame. Based at least in part on the results of the analysis, the coder component can assign (e.g., dynamically or automatically) respective initial subsets of bits to respective coding units of the raw video frame based at least in part on coding-related statistics, including statistics relating to the residual data, associated with the initial motion estimation of the raw video frame and at least one predefined encoding criterion. The at least one predefined encoding criterion can relate to at least one of: available computing resources for encoding of the raw video frame, residual data associated with the raw video frame, number of available bits for encoding of the raw video frame, number of actual bits consumed during encoding of a subset of coding units of the raw video frame, number of coding units to be encoded for the raw video frame, bandwidth requirements or constraints relevant to the raw video frame, media content complexity associated with the raw video frame, statistical information relating to previously encoded data, an encoding algorithm, a function associated with bit allocation for the raw video frame, level of granularity applied to a range of residual data energy in relation to bit allocation for the raw video frame, encoding-related factors, or respective weighting applicable to the encoding-related factors. The coder component can begin to encode all or a subset of the respective coding units using the respective initial subsets of bits.

In some implementations, after encoding a portion (e.g., one or more) of the coding units of the raw video frame, the coder component can identify real residual data associated with the encoded coding unit(s). The coder component can dynamically adjust the number of bits assigned to remaining coding units (e.g., coding units yet to be encoded) of the partially encoded video frame, based at least in part on the residual data associated with the remaining coding units and real residual data associated with the encoded coding unit(s).

Referring next to FIG. 7, depicted is a flow chart of another example method 700 for assigning (e.g., dynamically or automatically) bits to coding units of a raw video frame of a video frame sequence to facilitate encoding the raw video frame, in accordance with various aspects and implementations. At 702, an initial motion estimation of a raw video frame can be generated (e.g., using an estimator component) based at least in part on a previous raw video frame of the sequence. The raw video frame and the previous raw video frame can be part of a sequence of raw video frames of a video to be encoded by an encoder component or codec.

At 704, information relating to residual data resulting from the initial motion estimation of the raw video frame can be obtained. The coder component can obtain or identify information relating to residual data produced by the initial motion estimation of the raw video frame. At 706, encoding-related information comprising the residual data can be analyzed to generate analysis results. The coder component can analyze information, including the residual data resulting from the initial motion estimation for the raw video frame, total number of bits available for assignment, number of coding units of the raw video frame to be encoded, real residual data resulting from encoding of a coding unit(s) of the raw video frame (e.g., during subsequent iterations of encoding), predefined encoding criterion, etc.

At 708, respective subsets (e.g., initial or adjusted subsets) of bits can be assigned (e.g., dynamically or automatically) to respective coding units (e.g., all or remaining coding units) of the raw video frame based at least in part on the analysis results. The coder component can assign respective subsets of bits to respective coding units (e.g., coding units yet to be encoded) of the raw video frame based at least in part on the analysis results. The coder component can assign respective initial subsets of bits to respective coding units of the raw video frame based at least in part on the residual data associated with the initial motion estimation. In some implementations, after encoding a portion (e.g., one or more) of the coding units of the raw video frame, the coder component can adjust (e.g., modify) assignment of bits to remaining coding units of the raw video frame based at least in part on the residual data (e.g., initial or estimated residual data) associated with remaining coding units in relation to the initial motion estimation and real residual data associated with the encoded coding units of the partially encoded video frame.

At 710, a subset of the coding units of the raw video frame can be encoded using the respective subsets of bits assigned to respective coding units in the subset of coding units. For each coding unit in the subset of coding units, a coding unit can have a respective subset of bits assigned to that coding unit. The coder component can encode the subset of coding units, which can include all or a portion of the coding units of the raw video frame.

At 712, a determination can be made regarding whether there are any coding units (e.g., remaining coding units) of the raw (or partially raw) video frame that remain to be encoded. The coder component can determine whether there are any coding units of the coding frame that remain to be encoded. If it is determined that no coding units remain to be encoded for the current video frame, the encoding of this video frame can be completed, and at 714, a next raw video frame (if any remain) can be obtained. At this point, the method 700 can return to reference numeral 702 to perform an initial motion estimation of the next raw video frame of the video frame sequence, if there are any raw video frames that remain to be encoded.

Referring again to reference numeral 712, if, at 712, it is determined that there are coding units (e.g., remaining coding units) of the raw (or partially raw) video frame that remain to be encoded, at 716, information relating to real residual data relating to the encoded coding units of the video frame (e.g., partially encoded video frame) can be obtained. At this point, the method 700 can return to reference numeral 706, wherein encoding-related information including the real residual data of the encoded coding units can be analyzed (e.g., by the coder component) to generate analysis results, and the method 700 can proceed from that point.

FIG. 8 illustrates a flow chart of an example method 800 for calculating complexity scores for coding units of a raw video frame to facilitate bit assignment (e.g., dynamic or automatic) for efficient encoding of data, in accordance with various aspects and implementations. At 802, initial complexity scores can be assigned to respective coding units of the raw video frame of a video frame sequence. The coder component can assign an initial or nominal complexity score (e.g., 1) to each of the coding units of the raw video frame, based at least in part on residual data associated with the respective coding units (e.g., from the initial motion estimation) and predefined encoding criterion.

At 804, for all or a portion of the coding units of the raw video frame, the respective complexity scores (e.g., initial complexity scores, or complexity scores adjusted based on other factors) of the respective coding units can be adjusted based at least in part on a factor(s), in accordance with predefined encoding criterion. The coder component can adjust respective complexity scores of the respective coding units based at least in part on the factor(s). The factor(s) can be one or more of a number of factors that can include, for example, a level of energy of residual data for a coding unit in relation to other coding units in the raw video frame, maximum value of residual data of a coding unit, deviation in the coding unit, etc. For instance, the coder component can increase a complexity score of a coding unit when the coder component identifies the energy of the residual data to be at a relatively high level for a coding unit. As another example, the coder component can decrease a complexity score of a coding unit when the coder component identifies the deviation to be at a relatively low level for a coding unit.

At 806, a determination can be made (e.g., by the coder component) regarding whether there are any other factors to evaluate in relation to calculating complexity scores for the respective coding units of the raw video frame. If it is determined that one or more other factors remain to be evaluated in relation to calculating complexity scores for the respective coding units, the method 800 can return to reference numeral 804, wherein, for all or a portion of the coding units of the raw video frame, the respective complexity scores of the respective coding units can be adjusted (e.g., further adjusted) based at least in part on a next factor(s), in accordance with predefined encoding criterion. The method 800 can proceed from that point.

Referring again to reference numeral, 806, if, at 806, it is determined that no other factors remain to be evaluated in relation to calculating complexity scores for the respective coding units, at 808, respective subsets of bits can be assigned (e.g., by the coder component) to respective coding units of the raw video frame based at least in part on (e.g., as a function of) the respective complexity scores (e.g., final complexity scores) of the respective coding units of the raw video frame. The coder component can assign respective subsets of bits to respective coding units based at least in part on the respective complexity scores (e.g., in accordance with a bit assignment function or algorithm, as disclosed herein). The coder component can encode, or at least begin to encode, the coding units based at least in part on the respective bit assignments. In some implementations, after encoding some of the coding units of the raw video frame, the coder component can adjust bit assignments (e.g., dynamically or automatically) based at least in part on re-calculated complexity scores for coding units that remain to be encoded, wherein the complexity scores can be re-calculated in accordance with the method 800 and taking into account certain factors. The certain factors can include, for example, the real bits consumed during encoding of the encoded coding units, real residual energy associated with the encoded coding units, total remaining bits available for allocation to yet to be encoded coding units of the frame, and/or residual energy (e.g., initial or estimated residual energy) associated with the yet to be encoded coding units.

Figure 9:
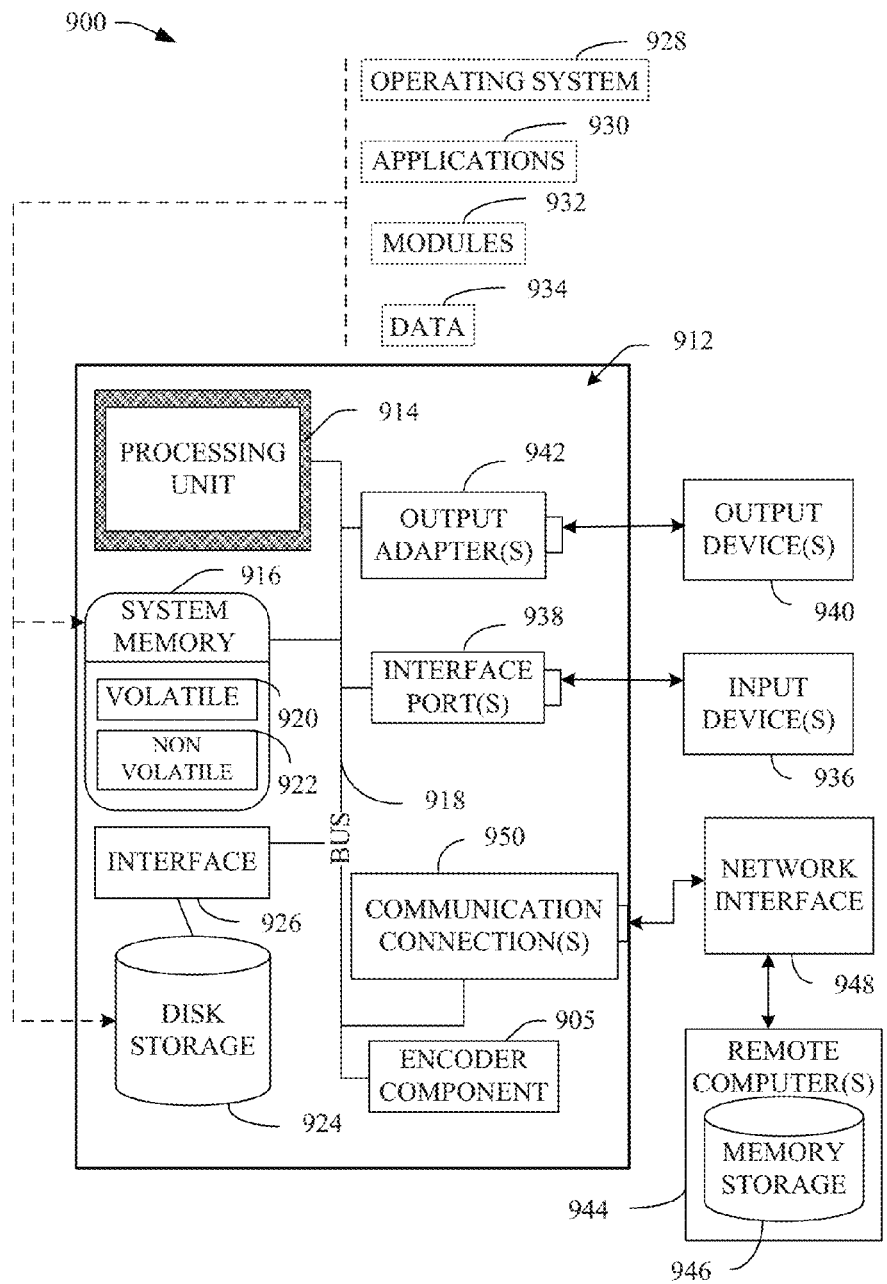
FIG. 9 is a schematic block diagram illustrating a suitable operating environment.
Figure 10:
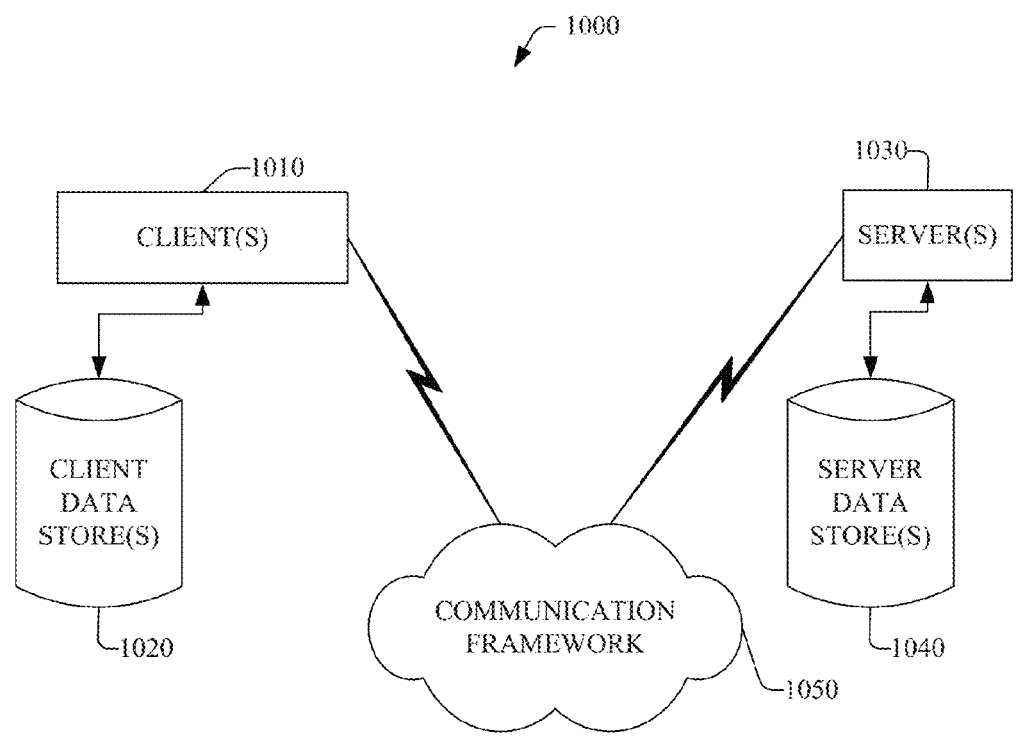
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented.

With reference to FIG. 9, a suitable environment 900 for implementing various aspects of this disclosure includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 also includes removable/non-removable, volatile/non-volatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computer system 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

In accordance with various aspects and implementations, the computer (e.g., 912) can be used to encode data, such as digital media data, which can be in the form of a sequence of video frames (e.g., raw video frames). As more fully disclosed herein, in some implementations, the computer can include a plurality of processors that can be used to process data, including performing various encoding tasks (e.g., generating initial motion estimation, determining whether to refine a motion estimation, refining a motion estimation, allocating bits for encoding of coding units, reconstructing a video frame, setting or adjusting a search range in relation to refining a motion estimation, etc.) on data (e.g., sequentially or in parallel). The computer includes an encoder component 905 (e.g., encoder, codec), which can contain, for example, an estimator component, coder component, and resource controller component, which can respectively function as more fully disclosed herein.

FIG. 10 is a schematic block diagram of a sample-computing environment 1000 with which the subject matter of this disclosure can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be appreciated and understood that components (e.g., encoder component, estimator component, coder component, resource controller component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone, tablet), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc, . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method comprising:
   identifying a first input frame from a sequence of input video frames;
   generating a first encoded frame by encoding the first input frame, wherein encoding the first input frame includes:
      generating a first encoded frame based on the first input frame, and
      generating a reconstructed frame based on the first encoded frame;
   identifying a second input frame from the sequence of input video frames;
   generating, by a processor in response to instruction stored on a non-transitory computer readable medium, a second encoded frame by encoding the second input frame, wherein encoding the second input frame includes:
      for each respective block from the second input frame:
         generating an estimated predicted block for the respective block by performing motion estimation using the first input frame as a reference frame, wherein generating the estimated predicted block is performed substantially in parallel with encoding the first input frame;
         determining a statistical measure of a difference between the estimated predicted block and the respective block; and
         determining an estimated bit allocation for encoding the respective block based on a function of the statistical measure and a count of available bits for encoding the second input frame, and
      generating a first encoded block by encoding a first block from the second input frame using the respective estimated bit allocation and using the reconstructed frame as a reference frame;
   including the first encoded frame in an output bitstream;
   including the second encoded frame in the output bitstream; and
   transmitting or storing the output bitstream.

2. The method of claim 1, wherein encoding the second input frame includes:
   determining an updated count of available bits for encoding the second input frame based on a difference between the count of available bits for encoding the second input frame and a count of bits utilized for encoding the first block;
   for each respective unencoded block from the second input frame, determining an updated estimated bit allocation for encoding the respective block based on the function using the updated count of available bits; and
   generating a second encoded block by encoding a second block from the second input frame using the respective updated estimated bit allocation and using the reconstructed frame as a reference frame.

3. The method of claim 2, wherein encoding the second input frame includes:
   identifying an update period corresponding to a count of encoded blocks from the second input frame; and
   determining the updated estimated bit allocation is performed periodically based on the update period.

4. The method of claim 1, wherein the statistical measure is based on a sum of absolute values for the difference between the estimated predicted block and the respective block.

5. The method of claim 1, wherein the function includes allocating bits for the respective block proportionally based on a residual energy distribution of the statistical measure for each respective block.

6. The method of claim 1, wherein the function includes:
   generating a plurality of residual segments by segmenting the blocks of the second input frame based on the statistical measure; and
   allocating bits for each respective segment from the plurality of residual segments proportionally based on a residual energy distribution of the plurality of residual segments.

7. The method of claim 1, wherein the function includes:
   determining a complexity for the respective block based on a plurality of metrics that includes the statistical measure.

8. The method of claim 7, wherein determining the complexity includes:
   using an initial value as the complexity for the respective block; and
   adjusting the complexity for the respective block based on each respective metric from the plurality of metrics.

9. The method of claim 8, wherein adjusting the complexity includes adjusting the complexity proportionally based on a distribution of the respective metric for each respective block.

10. The method of claim 8, wherein the plurality of metrics includes a maximum difference between the estimated predicted block and the respective block.

11. The method of claim 8, wherein the plurality of metrics includes a deviation of the difference between the estimated predicted block and the respective block.

12. The method of claim 7, wherein the function includes using, as the estimated bit allocation, a result of dividing a product of the complexity for the respective block and the available bits by a sum of the respective complexity for each respective block.

13. The method of claim 7, wherein encoding the second input frame includes:
- determining an updated count of available bits for encoding the second input frame based on a difference between the count of available bits for encoding the second input frame and a count of bits utilized for encoding the first block;
- for each respective unencoded block from the second input frame, determining an updated estimated bit allocation for encoding the respective block based on a result of dividing a product of the complexity for the respective block and the updated count of available bits by a sum of the respective complexity for each respective unencoded block; and
- generating a second encoded block by encoding a second block from the second input frame using the respective updated estimated bit allocation and using the reconstructed frame as a reference frame.

14. A method comprising:
- identifying a first input frame from a sequence of input video frames;
- generating a first encoded frame by encoding the first input frame, wherein encoding the first input frame includes:
  - generating a first encoded frame based on the first input frame, and
  - generating a reconstructed frame based on the first encoded frame;
- identifying a second input frame from the sequence of input video frames;
- generating, by a processor in response to instruction stored on a non-transitory computer readable medium, a second encoded frame by encoding the second input frame, wherein the second input frame includes a plurality of input blocks, and wherein encoding the second input frame includes:
  - generating a plurality of estimated predicted blocks, wherein each estimated predicted block from the plurality of estimated predicted blocks is generated by performing motion estimation using the first input frame as a reference frame, wherein generating the plurality of estimated predicted blocks is performed substantially in parallel with encoding the first input frame,
  - generating a plurality of complexity scores, wherein each complexity score from the plurality of complexity scores is based on a difference between a respective estimated predicted block from the plurality of estimated predicted blocks and a corresponding block from the plurality of input blocks,
  - determining a plurality of estimated bit allocations for encoding the second input frame, wherein each estimated bit allocation from the plurality of estimated bit allocations corresponds with a respective input block from the plurality of input blocks and is based on a corresponding complexity score from the plurality of complexity scores and a count of available bits for encoding the second input frame, and
  - generating a plurality of encoded blocks for the second input frame, wherein each encoded block from the plurality of encoded blocks is generated by encoding a respective input block from the plurality of input blocks using a corresponding estimated bit allocation from the plurality of estimated bit allocations and using the reconstructed frame as a reference frame;
- including the first encoded frame in an output bitstream;
- including the second encoded frame in the output bitstream; and
- transmitting or storing the output bitstream.

15. The method of claim 14, wherein determining the plurality of estimated bit allocations includes periodically updating the plurality of estimated bit allocations by:
- determining a plurality of utilization variances, wherein each utilization variance from the plurality of utilization variances indicates a difference between a respective number of bits utilized for generating a respective encoded block from the plurality of encoded blocks;
- determining a sum of the plurality of utilization variances;
- determining an updated count of available bits for encoding the second input frame based on a difference between the count of available bits and the sum of the plurality of utilization variances; and
- determining a plurality of updated estimated bit allocations for encoding the second input frame, wherein each updated estimated bit allocation from the plurality of updated estimated bit allocations corresponds with a respective unencoded input block from the plurality of input blocks and is based on a corresponding complexity score from the plurality of complexity scores and the updated count of available bits for encoding the second input frame.

16. The method of claim 15, wherein generating the plurality of encoded blocks includes generating the plurality of encoded blocks such that each encoded block from the plurality of encoded blocks that corresponds with a respective unencoded input block from the plurality of input blocks is generated by encoding the respective input block using a corresponding updated estimated bit allocation from the plurality of updated estimated bit allocations.

17. The method of claim 14, wherein generating the plurality of complexity scores includes adjusting each respective complexity score from the plurality of complexity scores based on each respective complexity metric from a plurality of complexity metrics.

18. The method of claim 17, wherein adjusting each respective complexity score includes:
- determining a distribution of the plurality of estimated predicted blocks based on the respective complexity metric; and
- adjusting the respective complexity score proportionally based on the respective distribution.

19. The method of claim 14, wherein determining the plurality of estimated bit allocations includes determining a respective result of dividing a product of a respective complexity score from the plurality of complexity values and the count of available bits by a sum of the plurality of complexity values for each respective estimated bit allocation from the plurality of estimated bit allocations.

20. A method comprising:
- identifying a first input frame from a sequence of input video frames;
- generating a first encoded frame by encoding the first input frame, wherein encoding the first input frame includes:
  - generating a first encoded frame based on the first input frame, and
  - generating a reconstructed frame based on the first encoded frame;

identifying a second input frame from the sequence of input video frames;

generating, by a processor in response to instruction stored on a non-transitory computer readable medium, a second encoded frame by encoding the second input frame, wherein the second input frame includes a plurality of input blocks, and wherein encoding the second input frame includes:
- generating a plurality of estimated predicted blocks, wherein each estimated predicted block from the plurality of estimated predicted blocks is generated by performing motion estimation using the first input frame as a reference frame, wherein generating the plurality of estimated predicted blocks is performed substantially in parallel with encoding the first input frame,
- generating a plurality of complexity scores, wherein each complexity score from the plurality of complexity scores is based on a difference between a respective estimated predicted block from the plurality of estimated predicted blocks and a corresponding block from the plurality of input blocks,
- determining a plurality of estimated bit allocations for encoding the second input frame, wherein each estimated bit allocation from the plurality of estimated bit allocations corresponds with a respective input block from the plurality of input blocks and is based on a corresponding complexity score from the plurality of complexity scores and a count of available bits for encoding the second input frame,
- identifying a first input block from the plurality of input blocks,
- generating a first encoded block by encoding the first input block using the corresponding estimated bit allocation from the plurality of estimated bit allocations and using the reconstructed frame as a reference frame,
- determining a utilization variance indicating a difference between a number of bits utilized for generating the first encoded block and the corresponding estimated bit allocation,
- determining an updated count of available bits for encoding the second input frame indicating a difference between the count of available bits for encoding the second input frame and the utilization variance,
- generating a plurality of updated complexity scores, wherein each updated complexity score from the plurality of updated complexity scores is based on a difference between a respective estimated predicted block from the plurality of estimated predicted blocks and a corresponding block, other than the first input block, from the plurality of input blocks,
- determining a plurality of updated estimated bit allocations for encoding the second input frame, wherein each updated estimated bit allocation from the plurality of updated estimated bit allocations corresponds with a respective input block, other than the first input block, from the plurality of input blocks and is based on a corresponding updated complexity score from the plurality of updated complexity scores and the updated count of available bits for encoding the second input frame,
- identifying a second input block, other than the first input block, from the plurality of input blocks,
- generating a second encoded block by encoding the second input block using the corresponding updated estimated bit allocation from the plurality of updated estimated bit allocations and using the reconstructed frame as a reference frame;

including the first encoded frame in an output bitstream;

including the second encoded frame in the output bitstream; and transmitting or storing the output bitstream.

* * * * *